(12) United States Patent
Hirayama et al.

(10) Patent No.: US 7,513,061 B2
(45) Date of Patent: Apr. 7, 2009

(54) SLUDGE DEHYDRATING PROCESSOR FOR CONVERTING SLUDGE INCLUDING ORGANIC SUBSTANCE INTO RESOURCES OF LOW WATER CONTENT

(75) Inventors: Kotaro Hirayama, Kawasaki (JP); Alden D. Pritchard, Virginia Beach, VA (US)

(73) Assignees: Dai-Ichi High Frequency Co., Ltd., Tokyo (JP); Bapic Incorporated, Virginia Beach, VA (US)

( * ) Notice: Subject to any disclaimer, the term of this patent is extended or adjusted under 35 U.S.C. 154(b) by 326 days.

(21) Appl. No.: 11/441,343

(22) Filed: May 26, 2006

(65) Prior Publication Data

US 2007/0272626 A1 Nov. 29, 2007

(51) Int. Cl.
*F26B 3/34* (2006.01)
(52) U.S. Cl. ............ 34/247; 34/594; 34/182; 34/218; 110/244; 110/246; 210/770; 423/608
(58) Field of Classification Search ........ 34/247, 34/314, 315, 381, 576, 594, 181, 182, 218; 210/770; 423/608; 110/244, 246
See application file for complete search history.

(56) References Cited

U.S. PATENT DOCUMENTS

| | | | | |
|---|---|---|---|---|
| 2,460,546 A | * | 2/1949 | Stephanoff | 523/319 |
| 3,600,818 A | * | 8/1971 | Lang et al. | 34/372 |
| 4,308,806 A | * | 1/1982 | Uemura et al. | 110/244 |
| 4,330,411 A | * | 5/1982 | Florin et al. | 210/769 |
| 4,371,382 A | * | 2/1983 | Ross | 210/788 |
| 4,958,578 A | * | 9/1990 | Houser | 110/246 |
| 4,970,803 A | * | 11/1990 | Keller | 34/371 |
| 5,092,959 A | * | 3/1992 | Orii et al. | 159/4.01 |
| 5,207,176 A | * | 5/1993 | Morhard et al. | 110/246 |
| 5,462,676 A | * | 10/1995 | Pitts | 210/774 |
| 5,523,060 A | * | 6/1996 | Hogan | 422/184.1 |
| 5,593,591 A | * | 1/1997 | Ohsol et al. | 210/609 |
| 5,611,947 A | * | 3/1997 | Vavruska | 219/121.52 |
| 5,993,749 A | * | 11/1999 | Adams | 422/186.3 |
| 6,161,305 A | * | 12/2000 | Maier et al. | 34/315 |
| 2005/0050759 A1 | * | 3/2005 | Chandran et al. | 34/576 |
| 2005/0051495 A1 | * | 3/2005 | Bowers et al. | 210/714 |
| 2006/0060525 A1 | * | 3/2006 | Hoffland | 210/603 |
| 2008/0286706 A1 | * | 11/2008 | Ponzi et al. | 431/9 |

* cited by examiner

*Primary Examiner*—S. Gravini
(74) *Attorney, Agent, or Firm*—Westerman, Hattori, Daniels & Adrian, LLP.

(57) ABSTRACT

There has been achieved a sludge dehydrating processor with less mechanical operation and with satisfactory dehydrating efficiency and heating efficiency. In order to process and convert sludge including an organic substance into solid fertilizer, a heating treatment zone for feeding and sterilizing an object to be treated and a dehydrating treatment/retrieving zone for separating water from the object to be treated and retrieving a treated object are provided. In the heating treatment zone, induction heating for efficiently heating the object to be treated without rotating a kiln body is introduced. In the dehydrating treatment/retrieving zone, a vortex air current producing mechanism for efficiently drying the object to be treated without rotating a dehydrating treatment chamber is introduced.

15 Claims, 8 Drawing Sheets

SLUDGE DEHYDRATING PROCESSOR FOR CONVERTING SLUDGE INCLUDING ORGANIC SUBSTANCE INTO RESOURCES OF LOW WATER CONTENT

BACKGROUND OF THE INVENTION

1. Field of the Invention

The present invention relates to a sludge dehydrating processor for conversion of sludge into resources of a low water content, the conversion represented by processing for converting waste sludge including living body scraps into a solid raw fertilizer, and specifically relates to a sludge processor through which continuously fed sludge is subjected as an object to be treated to a heating treatment for sterilization and a dehydrating treatment for reducing a water content.

Incidentally, the "solid raw fertilizer" refers to resources which have been dehydrated and solidified in accordance therewith and which will then be subjected to a fermenting maturing treatment for increasing performance of the fertilizer.

2. Description of the Related Art

Waste sludge which is living body scraps such as a residue of food processing and which includes water is converted into solid raw fertilizer or the like for reuse. In order to continuously carry out processing for converting the waste sludge into the solid raw fertilizer, an inclined rotary kiln is rotated about a shaft, the waste sludge which is an object to be treated is caused to flow into the rotary kiln so that the object to be treated is successively fed, and heated air is blown into the rotary kiln to thereby subject the object to be treated to a heating treatment for sterilization and a dehydrating treatment for reducing a water content so as to increase a net content and to solidify the object, for example.

However, heating is conducted while rotating a large kiln body is rotated in such a conventional waste sludge dehydrating processor and therefore a restart takes a long time and produces a large energy is lost once the processor stops. After the processor comes into a state of continuous operation, dehydrating efficiency and heating efficiency are poor.

Therefore, it is an object to accomplish a sludge dehydrating processor with less mechanical operation and with satisfactory dehydrating efficiency and heating efficiency.

SUMMARY OF THE INVENTION

To achieve the above object, according to the present invention, there is provided a sludge dehydrating processor for converting sludge including an organic substance into resources of low water content such as solid raw fertilizer, the processor including a heating treatment zone for heating the sludge which is raw material, i.e., the sludge fed while flowing as an object to be treated to a sterilizing treatment temperature in a flowing manner and a dehydrating treatment/retrieving zone for carrying out treatment of separating water from the high-temperature object to be treated which has passed through the heating treatment zone and retrieval of treated object which has been subjected to the treatment. The respective zones are formed as follows.

In other words, the heating treatment zone includes: a feed heating kiln body formed of at least one metal pipe in such a manner that a hollow portion of the metal pipe functions as a flow path for the object to be treated; a heating induction coil disposed to surround the kiln body to inductively heat the kiln body; and a high-frequency power supply unit for driving the coil.

The dehydrating treatment/retrieving zone includes: a cylindrical dehydrating treatment chamber; at least one lead-in path for the object to be treated and provided on one end side of the treatment chamber; at least one gas jet nozzle provided on the one end side so as to produce a vortex air current for causing the led-in object to be treated to travel via a route spirally swirling along an inner peripheral surface of the treatment chamber and in such a manner that a substantial tangent direction of the gas jet nozzle is a jetting direction on the inner peripheral surface; a gas feed mechanism for the nozzle; a treated object discharge port provided to the other end side of the treatment chamber; treated object retrieving equipment following the discharge port; an exhaust port provided to the one end side; and a forced exhaust mechanism connected to the exhaust port.

In this sludge dehydrating processor of the invention, because the induction heating has been introduced into the heating treatment zone, it is possible to efficiently heat the object to be treated without rotating the kiln body. Moreover, because a vortex air current producing mechanism has been introduced into the dehydrating treatment/retrieving zone, it is possible to efficiently dry the object to be treated without rotating the dehydrating treatment chamber. In other words, in the dehydrating treatment/retrieving zone, the object to be treated reaches the discharge port after suspending for a certain time period with an area of the object exposed to the gas being increased by the spiral swirling. As a result, evaporation and separation of water proceed with high efficiency and centrifugal separation of liquid-phase water having a great specific gravity also proceeds simultaneously. Moreover, the area exposed to the gas increases due to granulation attendant on traveling of the object to be treated while the object is dehydrated and therefore the driving force of the water separation is doubled. By properly increasing the temperature of the gas fed to the gas jet nozzle, dehydration and drying are further facilitated.

More specifically, because a typical use of the processor of the invention is conversion of the useless waste sludge which requires dumping cost into useful solid raw fertilizer, an added value is produced naturally. However, it is important to carry out the conversion processing at a cost commensurate with the added value. Dehydrating processing is essential in this conversion processing. In the invention, heating for the dehydrating processing and the like is carried out by using expensive electric energy. Therefore, it is necessary to pursue "dehydrating efficiency", "heating efficiency", "energy efficiency", and "a product value vs. cost-effectiveness". In consideration of a large treated amount, it is important to save a running cost and especially electricity cost.

The above-described sludge dehydrating processor of the invention employs a continuous method which reduces insufficiency of performance at start-up or loss of energy or time and also employs a basic design for obtaining high dehydrating efficiency and heating efficiency.

In addition to the basic design, the following further improvements are possible and preferable.

A static mixer is mounted in the hollow portion of the metal pipe forming the feed heating kiln body in the heating treatment zone to thereby enhance the heating efficiency and the energy efficiency.

The dehydrating treatment chamber in the dehydrating treatment/retrieving zone is in a tapered shape in such a manner that an inner diameter of at least one section of the chamber in a direction from the one end side toward the other end side decreases toward the other end side to thereby enhance the dehydrating efficiency.

The lead-in path for the object to be treated in the dehydrating treatment/retrieving zone is provided to join the gas jet nozzle to thereby sufficiently mix the object to be treated and the jetted gas and enhance the dehydrating efficiency.

A superheated steam generator is introduced into the gas feed mechanism and an output of the generator is connected to the gas jet nozzle in the dehydrating treatment/retrieving zone to thereby enhance the heating efficiency and by extension to enhance the dehydrating efficiency. If the superheated steam is used, a foul odor originating from raw material can remarkably be reduced.

A dehydration accelerating induction coil driven by the high-frequency power supply unit or another high-frequency power supply unit to inductively heat the treatment chamber is provided in the dehydrating treatment chamber in the dehydrating treatment/retrieving zone in such a manner as to surround the dehydrating treatment chamber to thereby enhance the heating efficiency and by extension to enhance the dehydrating efficiency.

A secondary raw material lead-in path for leading secondary raw material for adjusting composition of the treated object led into the dehydrating treatment/retrieving zone into the dehydrating treatment/retrieving zone is provided on a side of the dehydrating treatment/retrieving zone where the gas feed mechanism is disposed to thereby enhance the product value and by extension to enhance the product value vs. cost-effectiveness.

The secondary raw material lead-in path in the dehydrating treatment/retrieving zone is provided to join the gas jet nozzle to thereby sufficiently mix the secondary raw material and the jetted gas and enhance the product value.

A screw feeder is connected as a component of a treated object lead-in portion of the treated object retrieving equipment to the treated object discharge port in the dehydrating treatment/retrieving zone to thereby enhance the dehydrating efficiency.

The treated object retrieving equipment in the dehydrating treatment/retrieving zone collects the treated object discharged from the treated object discharge port by utilizing gravity to thereby reduce the cost of equipment and by extension to enhance the product value vs. cost-effectiveness.

A refrigerant passage for cooling the heating induction coil in the heating treatment zone is provided to the coil and refrigerant gas which has been fed into the passage and has finished cooling of the coil is supplied to the gas feed mechanism as fed gas to the gas jet nozzle in the dehydrating treatment/retrieving zone to thereby enhance the energy efficiency.

BRIEF DESCRIPTION OF THE DRAWINGS

FIGS. 2(a) to 2(c) show a structure of an induction heating feed heating kiln body in a heating treatment zone of embodiment 2 of the invention wherein FIG. 2(a) are a front view and a side view of a kiln body of a single metal pipe, FIG. 2(b) are a front view and a side view of a kiln body provided with a plurality of metal pipes arrange side by side, and FIG. 2(c) is a sectional view of a metal pipe in which a static mixer is mounted.

FIGS. 9(a) and 9(b) show a structure of a treated object lead-in portion of embodiment 9 of the invention, wherein

DETAILED DESCRIPTION OF PREFERRED EMBODIMENTS

Some embodiments of the sludge dehydrating processor of the present invention will be described with reference to the drawings. In the drawings, in order to make them simple and clear, illustrations of a fastening member such as a bolt, a coupling member such as a hinge, a driving source such as an electric motor, a transmission member such as a timing belt, an electric circuit such as a motor driver, an electric circuit such as a controller are omitted, and also members necessary and related to description of the invention are mainly shown in the drawings.

Embodiment 1

Figure 1:
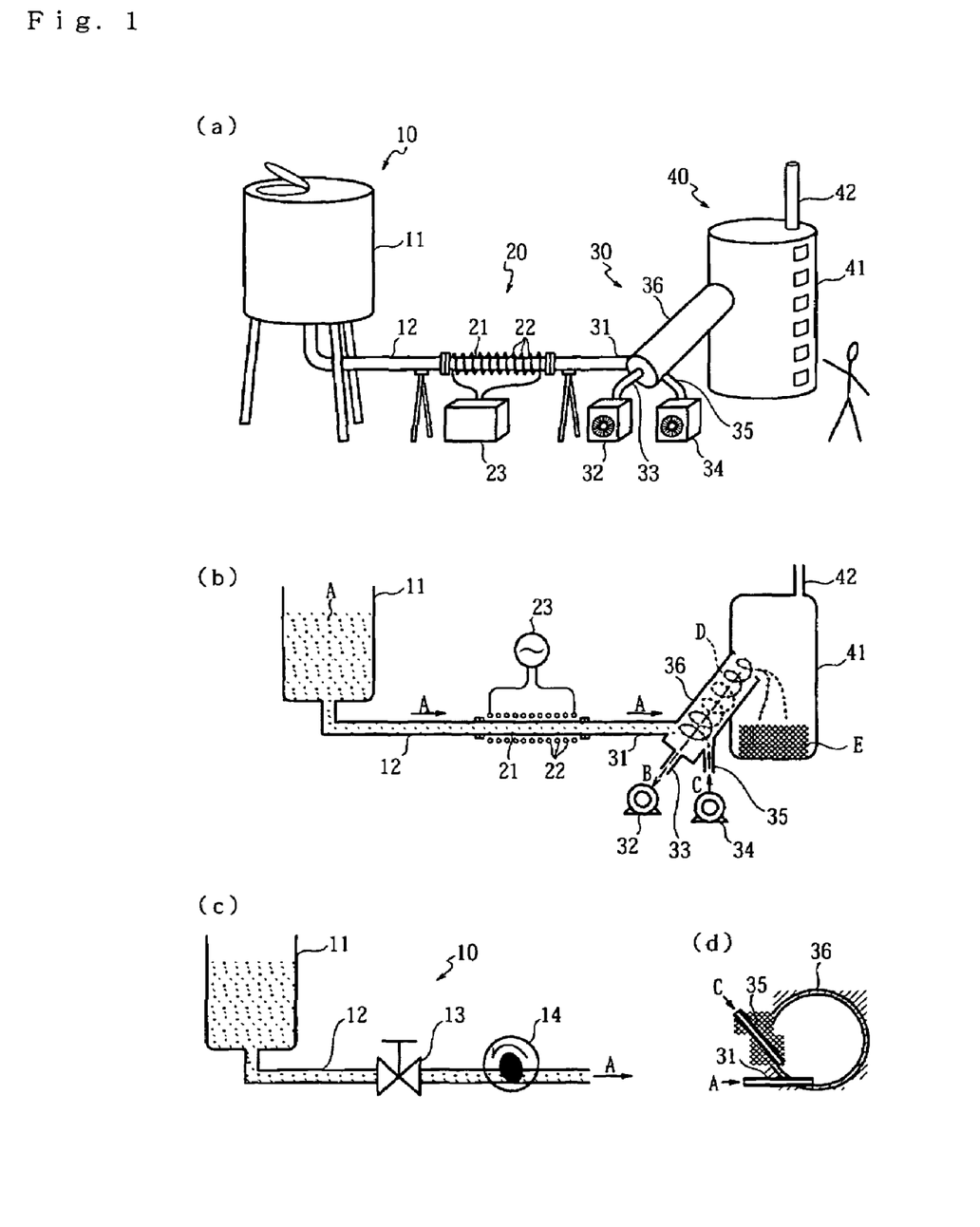
FIG. 1(a) is an overall external perspective view of a sludge dehydrating processor.
FIG. 1(b) is an overall sectional diagrammatic illustration.
FIG. 1(c) is a sectional diagram illustrating a variation of a raw material supply zone.
FIG. 1(d) is a sectional view of one end side of a dehydrating treatment chamber of embodiment 1 of the present invention.

A concrete structure of embodiment 1 of a sludge dehydrating processor of the invention will be described with reference to the drawings. FIG. 1(a) is an overall external perspective view, FIG. 1(b) is an overall sectional diagrammatic illustration, FIG. 1(c) is a sectional diagram illustrating a variation of a raw material supply zone 10, and FIG. 1(d) is a sectional view of one end side of a dehydrating treatment chamber 36.

This sludge dehydrating processor (see FIGS. 1(a) and 1(b)) has a raw material supply zone 10, a heating treatment zone 20, a dehydrating treatment zone 30, and a treated object retrieving zone 40 in order to continuously conduct a converting processing treatment for converting waste sludge including living body scraps into solid raw fertilizer. The respective zones are ranged in this order and respectively treat the successively flowing and passing sludge such as waste sludge as an object A to be treated. Any sludge, which can be fed through a hollow portion of a pipe body, can be treated as the object A to be treated by the sludge dehydrating processor.

The raw material supply zone 10 includes a sludge tank 11 for storing a proper amount of the object A to be treated so that supply of the object A does not stop and for applying a proper discharge pressure to the object A to be treated by utilizing a height difference or the like and a feed path 12 formed of a metal pipe, for example, to feed the object A to be treated from the sludge tank 11 to the heating treatment zone 20. A typical example of the tank has a tank capacity of 1000 L (liters), the discharge pressure of 0.1 Mpa, and a flow rate of 10 L/min, however the tank capacity, the discharge pressure, and the flow rate are not restricted to them. In the feed path 12 of the raw material supply zone 10 (see FIG. 1(c)), a valve 13 for temporarily suspending the supply of the object A to be treated and for throttling the flow rate may be interposed and connected and/or a tube pump 14, for example, for increasing the discharge pressure of the object A to be treated and for forcibly securing the flow rate may be interposed and provided.

To heat the object A to be treated to a sterilizing treatment temperature while the object A is fed in a flowing manner, the heating treatment zone 20 (see FIGS. 1(a) and 1(b)) includes a metal pipe 21 functioning as a feed heating kiln body, a heating induction coil 22 disposed to surround the kiln body, and a high-frequency power supply unit 23 for driving the coil 22. In order to use a hollow portion of the metal pipe 21 as a flow path for the object A to be treated, the metal pipe 21 has one end communicating with and connected to a discharge end of the feed path 12 of the raw material supply zone 10 and is made of stainless steel, for example, for inductively heating by the heating induction coil 22. A typical inner diameter is 50 mm and a typical length is 1000 mm, however the inner diameter and the length are not limited to them. The metal pipe 21 may be disposed with downward inclination to facilitate feed of the object A to be treated. It is the same with the feed path 12. The heating induction coil 22 is formed by winding an excellent electric conductor, e.g., a copper pipe and is supported by an insulator (not shown) so that a substantially constant space is maintained between the coil 22 and an outer peripheral surface of the metal pipe 21. A winding pitch of the heating induction coil 22 may be constant or may be varied. The high-frequency power supply unit 23 passes a high-frequency current enough to increase temperature of the metal pipe 21 to a sterilizing treatment temperature, e.g., 90° C. for the object A to be treated through the heating induction coil 22. An energization frequency of 20 KHz is possible and a maximum output is 50 KW, for example, however the frequency and the maximum output are not restricted to them.

The dehydrating treatment zone 30 (see FIGS. 1(a) and 1(b)) includes a cylindrical dehydrating treatment chamber 36 so as to conduct a treatment for removing water from the high-temperature object A to be treated after passage through the heating treatment zone 20. The dehydrating treatment chamber 36 is formed of a metal pipe, for example, and has a thicker hollow portion than the feed path 12 and the metal pipe 21. A typical inner diameter is 400 mm and a typical length is 800 mm, however the inner diameter and the length are not restricted to them. The dehydrating treatment chamber 36 may be in a horizontal, vertical, or diagonal attitude, however the diagonal attitude is convenient in consideration of discharge of drain water produced by dehydration and feed of the treated object into the treated object retrieving zone 40. In other words, the dehydrating treatment chamber 36 is preferably installed in an attitude in which an axis of the dehydrating treatment chamber 36 is oriented in a direction angled with respect to a horizontal plane. If there is a height difference between opposite ends of the dehydrating treatment chamber 36, the object A to be treated comes into the dehydrating treatment chamber 36 from a lower end and goes out from a higher end.

Connected to one end side which is an entrance side for the object A to be treated out of the opposite ends of the dehydrating treatment chamber 36 are a lead-in path 31 for the object to be treated and for leading the high-temperature object A to be treated discharged from the metal pipe 21 into the hollow portion of the dehydrating treatment chamber 36, a gas jet nozzle 35 for leading feed gas C into the hollow portion of the dehydrating treatment chamber 36, and an exhaust path 33 for forcibly exhausting exhaust gas B from the dehydrating treatment chamber 36, all of them formed of metal pipes or the like. The lead-in path 31 for the object to be treated has one end coupled to a discharge end of the metal pipe 21 (see FIGS. 1(a) and 1(b)) and the other end passing through and coupled to a peripheral wall portion of one end side of the dehydrating treatment chamber 36 (see FIG. 1(d)) to lead in the object A to be treated.

The gas jet nozzle 35 is installed on the peripheral wall of the one end side of the dehydrating treatment chamber 36 with its jet end portion passing through the peripheral wall portion of the one end side of the dehydrating treatment chamber 36 and with a substantial tangent direction being a jetting direction on an inner peripheral surface of the dehydrating treatment chamber 36 (see FIG. 1(d)). The other end of the gas jet nozzle 35 is coupled to a discharge port of a gas feed mechanism 34 such as a blower (see FIGS. 1(a) and 1(b)). Therefore, the fed gas C jetted from the gas jet nozzle 35 and blown into the hollow portion of the dehydrating treatment chamber 36 moves from the one end side to the other end side of the dehydrating treatment chamber 36 while spirally swirling along the inner peripheral surface of the dehydrating treatment chamber 36 and becomes a vortex air current D. The object A to be treated and led from the lead-in path 31 for the object to be treated into the hollow portion of the dehydrating treatment chamber 36 is caused to travel via a route for spirally swirling along the inner peripheral wall of the dehydrating treatment chamber 36 and carried to a treated object discharge port formed on the other end side of the dehydrating treatment chamber 36 by the fed gas C jetted from the gas jet nozzle 35 and blown into the hollow portion of the dehydrating treatment chamber 36. The fed gas C may be room temperature or high-temperature dry air at temperature of 20 to 200° C. and with a flow rate of 10 L/min to 100 L/min according to normal and preferable specifications however the fed gas C is not restricted to them.

Moreover (see FIGS. 1(a) and 1(b)), an exhaust port for exhausting the exhaust gas B is formed to pass through a center of an end surface of the one end side of the dehydrating treatment chamber 36, one end of the exhaust path 33 communicates with and is connected to the exhaust port, and the other end of the exhaust path 33 communicates with and is connected to a suction port of a forced exhaust mechanism 32. Therefore, the fed gas C blown into the dehydrating treatment chamber 36 from the one end side becomes the vortex air current D and reaches the other end side of the dehydrating treatment chamber 36 and then a major part of the fed gas C passes through an axis of the vortex air current D to return to the one end side of the dehydrating treatment chamber 36 and becomes the exhaust gas B to go out of the dehydrating treatment chamber 36. The drain water produced in the dehydrating treatment chamber 36 is discharged together with the exhaust gas B from the one end side of the dehydrating treatment chamber 36 or from a drain port (not shown) on the one end side of the dehydrating treatment chamber 36.

In order to retrieve treated object E after the dehydrating treatment, the treated object retrieving zone 40 (see FIGS. 1(a) and 1(b)) includes a treated object retrieving tank 41 having an emission smokestack 42 as treated object retrieving equipment following the treated object discharge port on the other end side of the dehydrating treatment chamber 36. The treated object discharge port of the dehydrating treatment chamber 36 communicates with and is connected to an upper portion of the treated object retrieving tank 41 and the treated object E discharged from the discharge port into the treated object retrieving tank 41 falls and drops down through the treated object retrieving tank 41 and accumulates as if it is stored on an inner bottom of the treated object retrieving tank 41. A typical tank capacity is 2000 L and a taking-out port and a transparent window for visually recognizing the treated object E are preferably formed in the tank 41 but are optional. The emission smokestack 42 may be a simple one without attachments as shown in the drawings or may be one attached with a degassing device and a ventilator (not shown).

A form of use and an operation of the sludge dehydrating processor of embodiment 1 will be described.

As living body scraps which can be converted into the solid raw fertilizer, there are a meat residue, a sewage residue, and the like. Sludge including a kind or a plurality of kinds of these living body scraps is referred to as waste sludge. The waste sludge may include inorganic substances in addition to the organic substances and water. When such waste sludge is collected by proper means such as a sludge transportation vehicle and a transport pipe and stored in the sludge tank 11, the object A to be treated is ready for supply. Then, when the sludge dehydrating processor is brought into operation, the object A to be treated is successively processed into the treated object E and the treated object E accumulates in the treated object retrieving tank 41 to become the solid raw fertilizer as follows.

In other words, the object A to be treated is discharged from the sludge tank 11 to the feed path 12 in the raw material supply zone 10 and is fed into the metal pipe 21 in the heating treatment zone 20.

In the heating treatment zone 20, the object A to be treated flows and passes through the hollow portion of the metal pipe 21. In the heating treatment zone 20, the high-frequency power supply unit 23 passes a high-frequency current through the heating induction coil 22 to thereby inductively-heat the metal pipe 21 to high temperature. As a result, heat is transferred from the metal pipe 21 to the object A to be treated to increase temperature of the object A to sterilizing treatment temperature while the object A passes through the metal pipe 21. Thus, the object A to be treated is heated and sterilized and sent into the lead-in path 31 for the object to be treated in the dehydrating treatment zone 30.

In the dehydrating treatment zone 30, the fed gas C is blown at high speed from the gas feed mechanism 34 through the gas jet nozzle 35 into the dehydrating treatment chamber 36 to be the vortex air current D, the vortex air current D moves from the one end side to the other end side of the dehydrating treatment chamber 36 while it is spirally swirling in the dehydrating treatment chamber 36 to be the exhaust gas B, and the exhaust gas B returns from the other end side to the exhaust port on the one end side of the dehydrating treatment chamber 36 through the central portion of the vortex air current D and is exhausted by the forced exhaust mechanism 32 through the exhaust path 33. Therefore, when the object A to be treated passes through the lead-in path 31 for the object to be treated and flows into the dehydrating treatment chamber 36 from the one end side of the dehydrating treatment chamber 36, the object A to be treated is carried by the vortex air current D to the treated object discharge port on the other end side of the dehydrating treatment chamber 36. At this time, because the object A to be treated moves through an outer annular area along a peripheral wall surface of the dehydrating treatment chamber 36 while it is crumpled and exposed to the gas with an increased area over a spiral long distance and thus it takes a log time to move in the dehydrating treatment chamber 36, the object A is dehydrated and dried, is separated from the exhaust gas B due to centrifugal force at the treated object discharge port to be discharged from the dehydrating treatment chamber 36, and moves to the treated object retrieving zone 40.

In the treated object retrieving zone 40, the treated object E is discharged from the treated object discharge port of the dehydrating treatment chamber 36 into the treated object retrieving tank 41, flutters down like snow in the treated object retrieving tank 41, and accumulates at the inner bottom of the treated object retrieving tank 41.

Thus, in this sludge dehydrating processor, it is possible to efficiently heat and dry the object to be treated without motion such as rotation of the metal pipe 21 which is the feed heating kiln body and the dehydrating treatment chamber 36 which is the feed dehydrating cylinder body. Upon start-up of the processor, increase of the temperature of the metal pipe 21 to the sterilizing treatment temperature can be carried out more swiftly than heating of the rotary kiln and production of the vortex air current D in the dehydrating treatment chamber 36 can be carried out more swiftly than acceleration of rotation of the rotary kiln.

Embodiment 2

Figure 2:
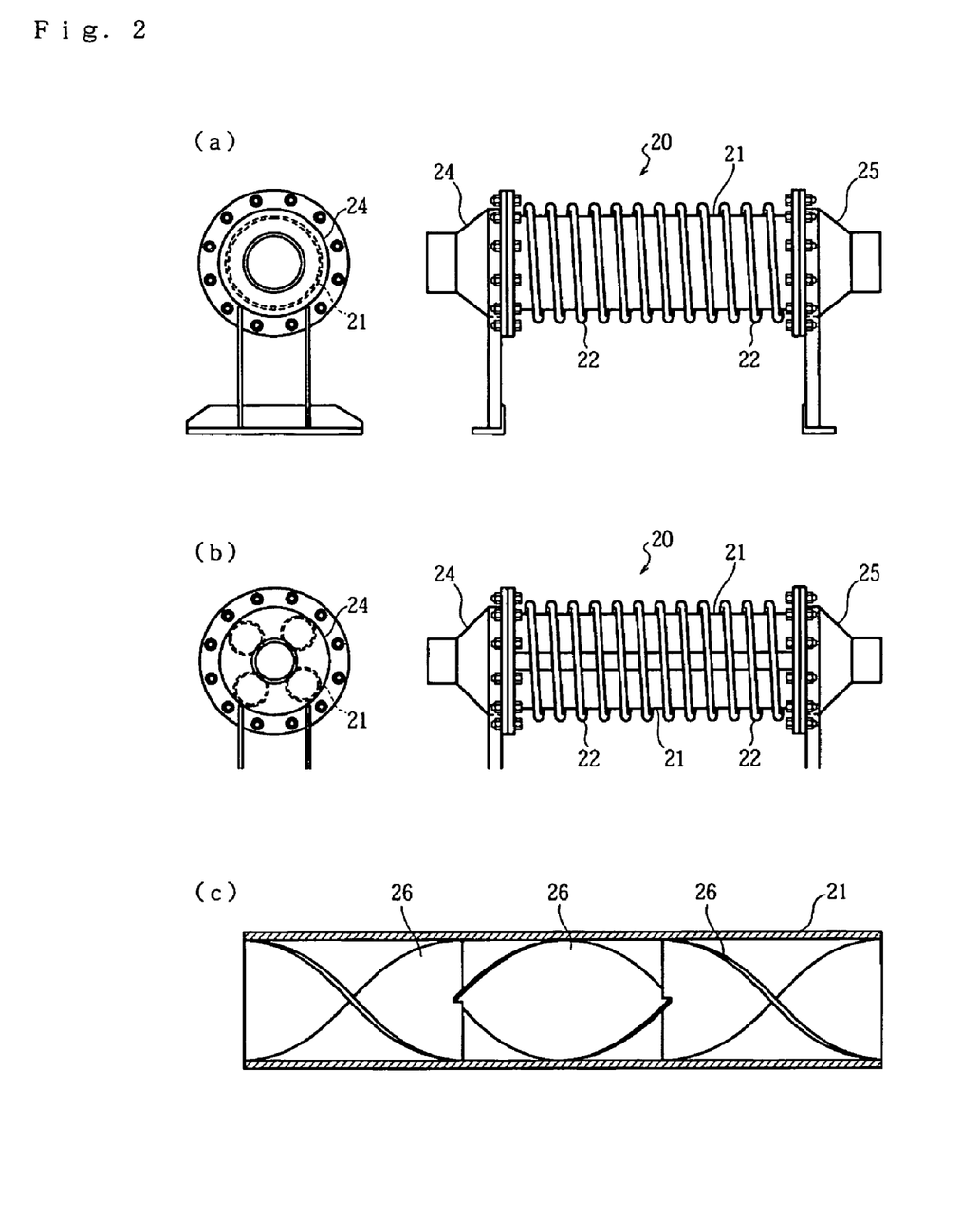

A concrete structure of embodiment 2 of the sludge dehydrating processor of the invention will be described with reference to the drawings. FIGS. 2(a) to 2(c) show a structure of an induction heating feed heating kiln body wherein FIG. 2(a) are a front view and a side view of a kiln body of a single metal pipe 21, FIG. 2(b) are a front view and a side view of a kiln body provided with a plurality of metal pipes 21, 21 arrange side by side, and FIG. 2(c) is a sectional view of a metal pipe 21 in which a static mixer 26 is mounted.

This sludge dehydrating processor is different from that of above-described embodiment 1 in that the static mixer 26 is mounted in the metal pipe 21.

The feed heating kiln body of the heating treatment zone 20 may be formed of not only one metal pipe 21 (see FIG. 2(a)), but also a plurality of small-diameter pipes may be arranged side by side (see FIG. 2(b)). If the plurality of pipes is arranged side by side, the pipe diverges at a lead-in portion 24 and the pipes join into one at a discharge portion 25. In this form, because the object A to be treated is split into the respective small-diameter metal pipes 21, heat transfer time in a radial direction is shortened in each metal pipe 21 to swiftly make the heat uniform in the radial direction to thereby suppress nonuniform heating of the object A to be treated. In either of these cases, the lead-in portion 24 is coupled to the feed path 12 and the discharge portion 25 is coupled to the lead-in path 31 for the object to be treated and therefore axial movement of the opposite ends is restricted. In order to absorb axial expansion and contraction of the metal pipe(s) 21 due to thermal expansion, the feed path 12 may be formed of flexible tube member or a bellows pipe body may be inserted in the lead-in portion 24 and/or the discharge portion 25.

The static mixer 26, . . . , 26 (see FIG. 2(c)) is formed by twisting plates having substantially the same width as the inner diameter of the metal pipe 21 and a plurality of/a large number of blade bodies 26 are normally connected in series and fitted and inserted in the hollow portion of the metal pipe 21. Adjacent blade bodies 26 are normally arranged so that end portions of the respective blade bodies 26 intersect substantially at right angles with each other. When only one metal pipe 21 is provided, the blade bodies 26 of the static mixer are mounted throughout a length of the metal pipe 21, for example. When the plurality of metal pipes 21 are provided, the blade bodies 26 of the static mixer are mounted throughout a length of each metal pipe 21, for example.

In this case, when the object A to be treated flows through the hollow portion of the metal pipe 21, operation in which the object A to be treated is divided into two by each blade body 26 of the static mixer and then twisted is repeated a plurality of times by the blade body 26 at each stage to homogenize the object A to be treated and change radial places in the metal pipe 21. As a result, the object A to be treated is sufficiently stirred as it is fed and therefore homogenization and uniform heating of the object A to be treated which are linked to improvement of quality of the treated object and swift heating of the object A to be treated which increases productivity can be achieved simultaneously. Yet, only power required to achieve them is energy for feed.

Embodiment 3

Figure 3:
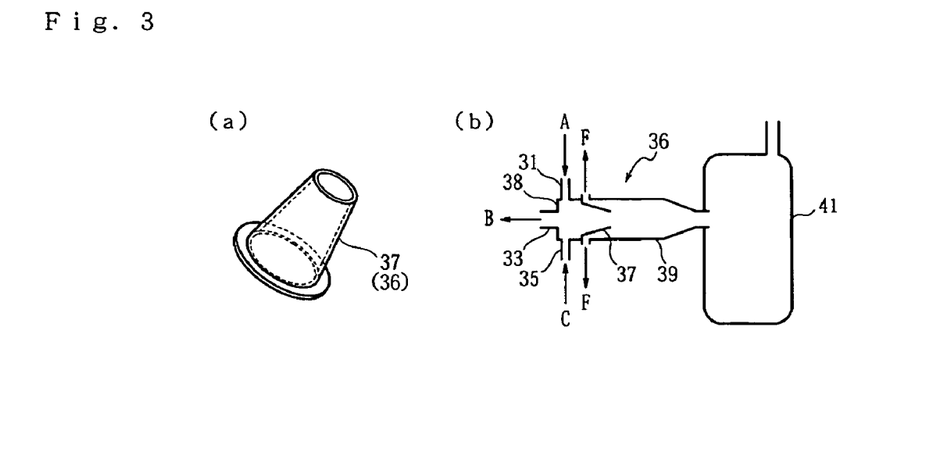
FIG. 3(a) is an external perspective view of a tapered cylinder body of a dehydrating treatment chamber and FIG. 3(b) is a sectional diagram illustrating a dehydrating treatment/retrieving zone of embodiment 3 of the invention.

A concrete structure of embodiment 3 of a sludge dehydrating processor of the invention will be described with reference to the drawings. FIG. 3(a) is an external perspective view of a tapered cylinder body 37 of a dehydrating treatment chamber 36 and FIG. 3(b) is a sectional diagram illustrating a dehydrating treatment zone 30 and a treated object retrieving zone 40.

This sludge dehydrating processor is different from those of above-described embodiments 1 and 2 in that a tapered section is formed at the dehydrating treatment chamber 36 of the dehydrating treatment zone 30.

At least a section of the dehydrating treatment chamber 36 in a direction from one end side which is a lead-in side of the object A to be treated and the fed gas C toward the other end side which is a discharge side of the treated object E is in a tapered form with an inner diameter decreases toward the other end side.

To put is concretely, the tapered cylinder body 37 is employed as an important member of the dehydrating treatment chamber 36 (see FIG. 3(a)) and is disposed at a middle portion in an axial direction of the dehydrating treatment chamber 36 (see FIG. 3(b)), one-end-side member 38 to which the lead-in path 31 for the object to be treated, the exhaust path 33, and the gas jet nozzle 35 are coupled is disposed on the one end side of the dehydrating treatment chamber 36, and the-other-end-side member 39 coupled to the treated object retrieving tank 41 is disposed on the other end side of the dehydrating treatment chamber 36. With a large-diameter side of the tapered cylinder body 37 and the one-end-side member 38 closely coupled to each other and a small-diameter side of the tapered cylinder body 37 inserted into a hollow of the-other-end-side member 39, the tapered cylinder body 37 and the-other-end-side member 39 are closely coupled to each other. Although it is optional, a degassing port for releasing the released gas F from the-other-end-side member 39 is formed at a portion of the-other-end-side member 39 corresponding to an outer periphery of the tapered cylinder body 37 in this embodiment.

In this case, the tapered section is secured in the dehydrating treatment chamber 36 by the hollow portion of the tapered cylinder body 37. In this tapered section, spiral swirling angular speed and by extension centrifugal force by the vortex air current D of the object A to be treated increase from the entrance side to the exit side and therefore stirring effect increases. As a result, dissipation of a vapor film surrounding the object A proceeds to thereby facilitate evaporation and separation of water. The stirring effect becomes pronounced when apparent increase in flowability of the object A to be treated, i.e., decrease in mechanical impedance associated with the granulation of the object A to be treated which develops from the entrance side toward the exit side in the tapered section is matched to increase in the spiral swirling angular speed of the vortex air current D. Therefore, it is preferable to set the tapered section and an angle of the taper so as to satisfy the matching condition.

Moreover, when the dehydrating treatment chamber 36 is installed horizontally, the taper by the tapered cylinder body 37 is effective at reducing a dehydration load by discharge of drainage outside the system. This is because the drainage originating from free water in the object A to be treated and condensate water in a low temperature rise area is liable to be produced on the entrance side of the object A to be treated. It is also possible to employ a tapered shape at an end portion of the-other-end-side member 39 to be coupled to the treated object retrieving tank 41. This taper of the treated object discharge port side is effective as a guide funnel for discharging the treated object.

Embodiment 4

Figure 4:
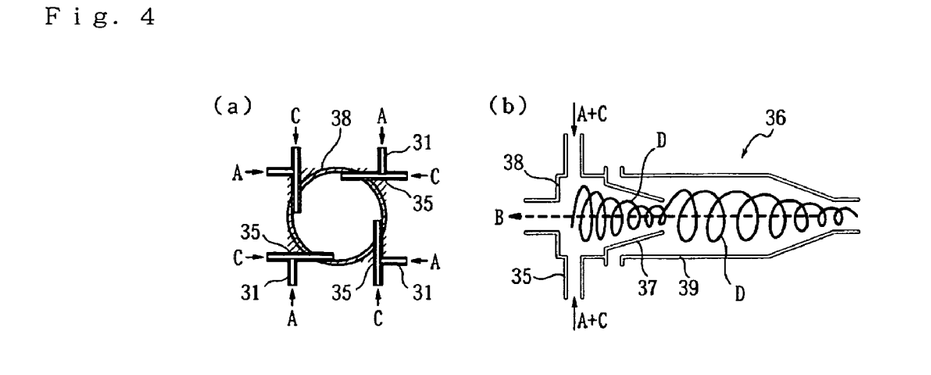
FIG. 4(a) is a sectional view of one-end-side member of a dehydrating treatment chamber and FIG. 4(b) is a sectional diagram illustrating a dehydrating treatment chamber of embodiment 4 of the invention.

A concrete structure of embodiment 4 of a sludge dehydrating processor of the invention will be described with reference to the drawings. FIG. 4(a) is a sectional view of one-end-side member 38 of a dehydrating treatment chamber 36 and FIG. 4(b) is a sectional diagram illustrating the dehydrating treatment chamber 36.

This sludge dehydrating processor is different from that of the above-described embodiment 3 in that a plurality of lead-in paths 31 for the object to be treated and a plurality of gas jet nozzles 35 are provided in the dehydrating treatment zone 30 and that the lead-in paths 31 for the object to be treated joining the gas jet nozzles 35 communicate with and are connected to the one-end-side member 38 of the dehydrating treatment chamber 36, respectively, in a plurality of positions.

In this case, joining before jetting facilitates mixture of the object A to be treated and the fed gas C and jetting from the plurality of separate positions ensures production of the vortex air current D to thereby stably maintain the vortex air current D.

Embodiment 5

Figure 5:
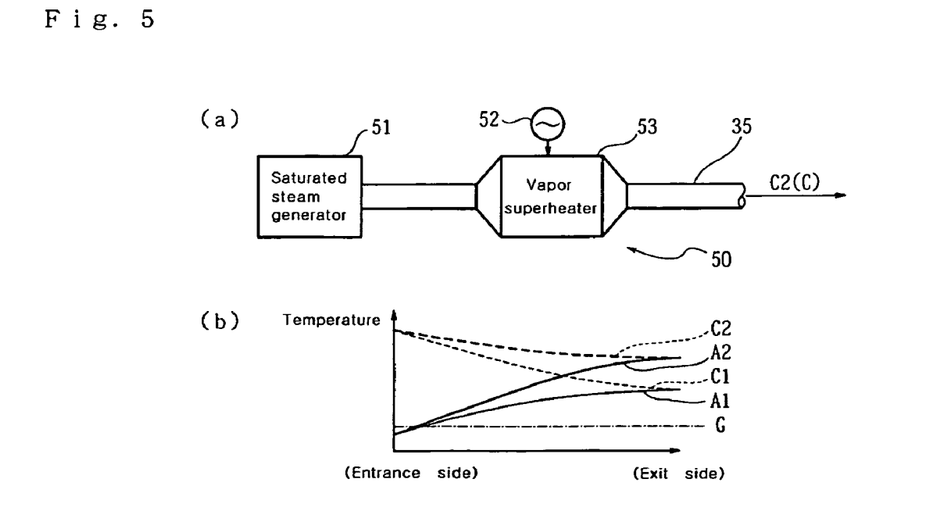
FIG. 5(a) is a block diagram of a superheated steam generator and FIG. 5(b) is a graph showing variation in temperature of an object to be treated, a vertical axis representing the temperature and a horizontal axis representing an axial position of a dehydrating treatment chamber of embodiment 5 of the invention.

A concrete structure of embodiment 5 of a sludge dehydrating processor of the invention will be described with reference to the drawings. FIG. 5(a) is a block diagram of a superheated steam generator 50 and FIG. 5(b) is a graph showing variation in temperature of an object A to be treated, a vertical axis representing the temperature and a horizontal axis representing an axial position of a dehydrating treatment chamber 36.

This sludge dehydrating processor is different from those of the above-described embodiments 1 to 4 in that the superheated steam generator 50 as the gas feed mechanism 34 is connected to the gas jet nozzle 35 of the dehydrating treatment zone 30.

In the superheated steam generator 50 (see FIG. 5(a)), a saturated vapor generator 51 generates saturated vapor, a vapor superheater 53 through which a high-frequency current is passed by a high-frequency power supply unit 52 further heats the saturated vapor to thereby generate superheated steam C2 as the fed gas C, and the superheated vapor C2 is blown into the dehydrating treatment chamber 36 by the gas jet nozzle 35.

In this case, because heat capacity per volume of the superheated steam C2 is about 1.2 times larger than that of air, heating efficiency of the object A to be treated increases. For detailed description, temperature A1 of the object to be treated when heating dry air C1 is used as the fed gas C and temperature A2 of the object to be treated when the superheated steam C2 is used as the fed gas C are graphed to compare temperature variations of the object A to be treated with each other (see FIG. 5(b)). If the assumption is made that temperature C1 of the heating dry air and temperature C2 of the superheated steam when lead into the dehydrating treatment chamber 36 are the same as each other for clarification of a heat load relationship, the temperature A1 of the object to be treated slowly increases because the temperature C1 of the heating dry air swiftly decreases while the temperature A2 of the object to be treated swiftly increases because the temperature C2 of the superheated sream slowly decreases. In this manner, the object A to be treated is heated with efficiency.

Moreover, because deodorizing effect and odor generating source breaking down effect not possessed by the heating dry air are possessed by the superheated steam, the treated object E does not give off a foul odor by using the superheated steam.

Embodiment 6

Figure 6:
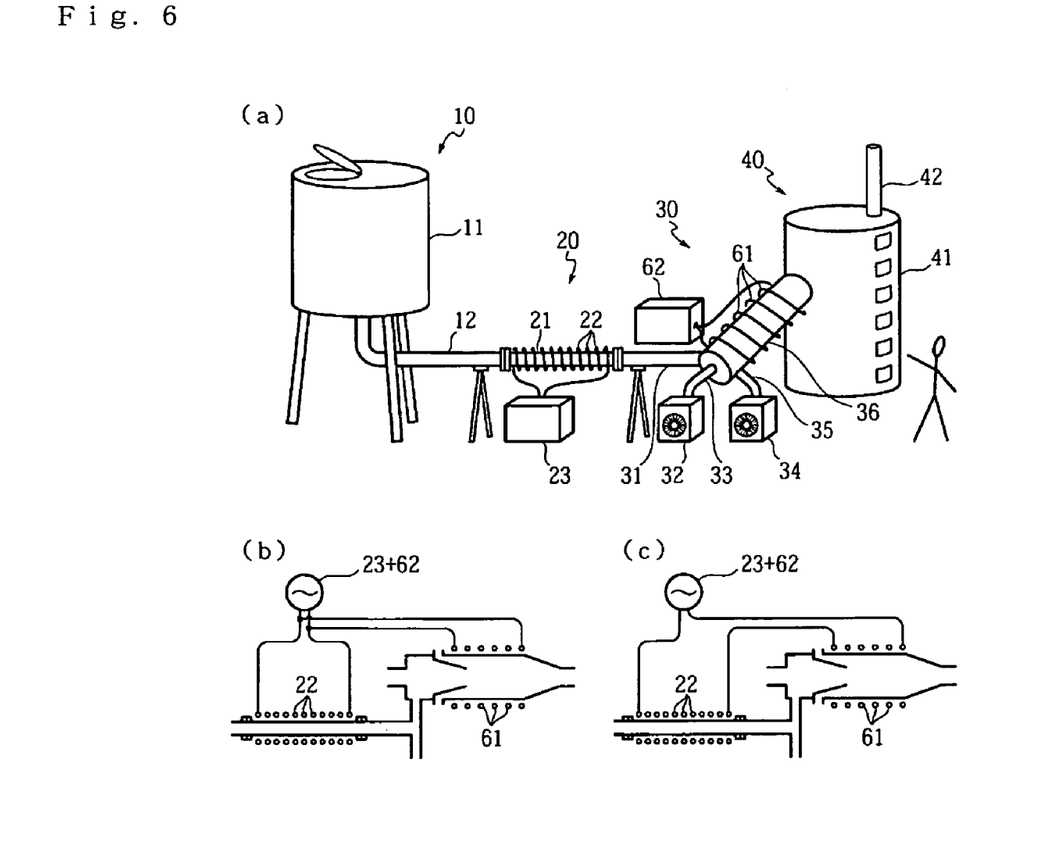
FIG. 6(a) is an overall external perspective view of a sludge dehydrating processor.
FIG. 6(b) is a sectional diagram illustrating an essential portion of a variation.
FIG. 6(c) is a sectional diagram illustrating an essential portion of another variation of embodiment 6 of the invention.

A concrete structure of embodiment 6 of a sludge dehydrating processor of the invention will be described with reference to the drawings. FIG. 6(a) is an overall external perspective view of a sludge dehydrating processor, FIG. 6(b) is a sectional diagram illustrating an essential portion of a variation, and FIG. 6(c) is a sectional diagram illustrating an essential portion of another variation.

This sludge dehydrating processor is different from those of the above-described embodiments 1 to 5 (see FIG. 6(a)) in that a dehydration accelerating induction coil 61 for inductively heating the dehydrating treatment chamber 36 so as to accelerate dehydration and a high-frequency power supply unit 62 for passing a high-frequency current through the coil 61 are installed in addition to the dehydrating treatment chamber 36 in the dehydrating treatment zone 30 in such a manner as to surround the chamber 36.

It is also possible to use one high-frequency power supply unit 23+62 for driving both the dehydration accelerating induction coil 61 and the heating induction coil 22 in the heating treatment zone 20. In this case, a ratio of electric power distribution to both the coils is set by respectively adjusting a current distribution ration in a case of parallel connection (see FIG. 6(b)) and a voltage distribution ratio in a case of series connection (see FIG. 6(c)) by adjustment of a specifications ratio of both the coils.

A winding pitch of the dehydration accelerating induction coil 61 may be constant or may be varied. A high-frequency current is passed through the dehydration accelerating induction coil 61 by a power supply unit which can pass a current of a frequency of 20 KHz and the maximum output of which is 50 KW, for example, however the power supply unit is not restricted to them. It is essential only that induction heating heat input which can achieve on object of increasing dehydrating efficiency so as to maintain a water content of the treated object at 50% or lower or to further reduce the water content be obtained.

In this case, because the object A to be treated is heated not only in the heating treatment zone 20 but also in the dehydrating treatment zone 30, dehydrating treatment efficiency and dehydration rate of the object A to be treated are increased to thereby obtain the treated object E which has been dried sufficiently.

Embodiment 7

Figure 7:
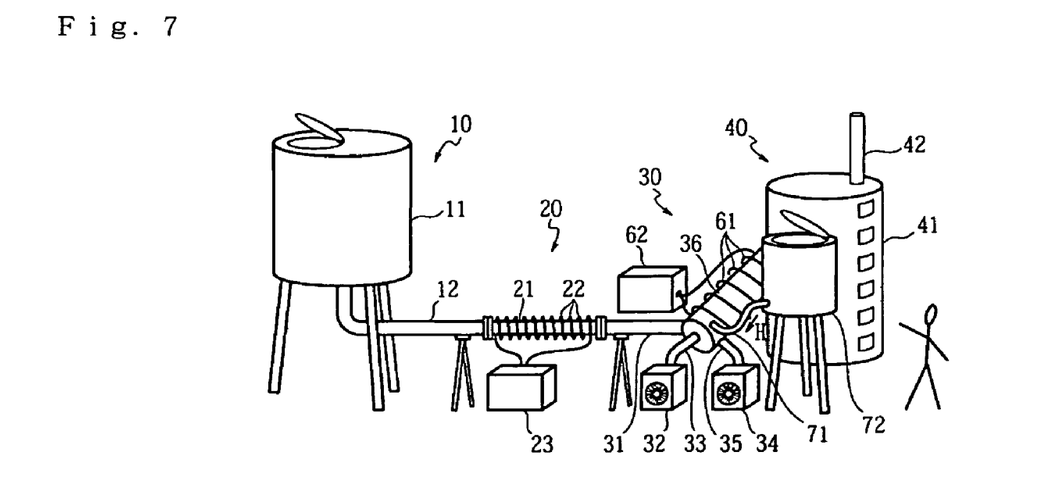
FIG. 7 is an overall external perspective view of a sludge dehydrating processor of embodiment 7 of the invention.

A concrete structure of embodiment 7 of a sludge dehydrating processor of the invention will be described with reference to the drawing. FIG. 7 is an overall external perspective view of a sludge dehydrating processor.

This sludge dehydrating processor is different from those of the above-described embodiments 1 to 6 in that a secondary raw material lead-in path 71 and a secondary raw material tank 72 are provided to the dehydrating treatment zone 30 on a side where the gas feed mechanism 34 is installed.

The secondary raw material tank 72 is for storing secondary raw material H and the secondary raw material lead-in path 71 is formed of a metal pipe, for example, and has one end communicating with and connected to the secondary raw material tank 72 and the other end communicating with and connected to the one end side of the dehydrating treatment chamber 36 to lead the secondary raw material H into the dehydrating treatment chamber 36 in the dehydrating treatment zone 30. A tank capacity is 50 to 500 L and a feed flow rate is in a range of 0.1 to 1 kg/min according to normal and preferable specifications however the tank capacity and the feed flow rate are not restricted to them.

In this case, the secondary raw material H is also led into the dehydrating treatment zone 30 at the same time as leading of the object A to be treated into the dehydrating treatment zone 30. Because the object A to be treated and the secondary raw material H are stirred and mixed sufficiently by the swirling air current D as they pass through the dehydrating treatment zone 30, a composition of the treated object E has been adjusted uniformly when the treated object E is led from the dehydrating treatment zone 30 into the treated object retrieving zone 40.

As the secondary raw material H, in a case of converting the waste sludge into the solid raw fertilizer, for example, organic substance powder and other enriching nourishment for obtaining preferable carbon/nitrogenous material ratios are prepared so as to increase added values. To put it concretely, sawdust, waste tire scraps, and the like are preferable, however the secondary raw material H is not limited to them.

Embodiment 8

Figure 8:
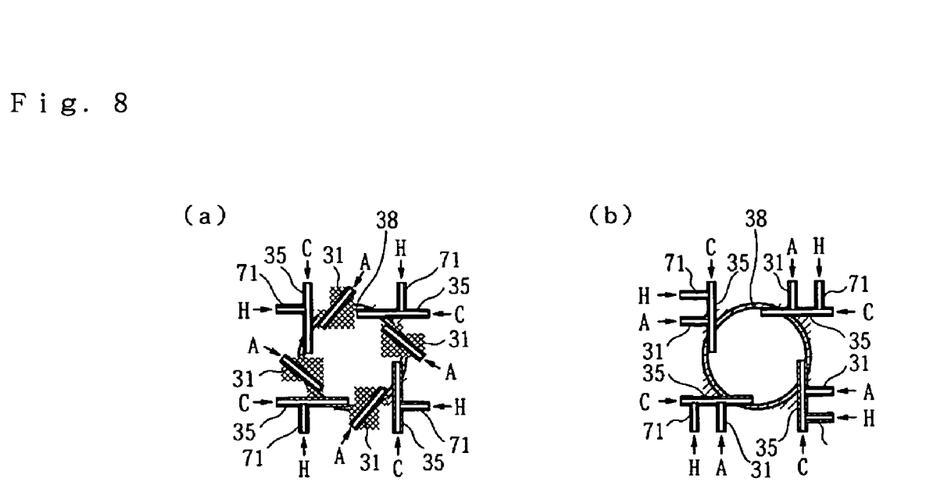
FIG. 8(a) is a sectional view of one-end-side member of a dehydrating treatment chamber and FIG. 8(b) is a sectional view of a variation of the member of embodiment 8 of the invention.

A concrete structure of embodiment 8 of a sludge dehydrating processor of the invention will be described with reference to the drawings. FIG. 8(a) is a sectional view of one-end-side member 38 of a dehydrating treatment chamber 36 and FIG. 8(b) is a sectional view of a variation of the member.

This sludge dehydrating processor is different from that of the above-described embodiment 7 in that the secondary raw material lead-in path 71 in the dehydrating treatment zone 30 and the gas jet nozzle 35 are provided to join each other.

Only the secondary raw material lead-in path 71 may join the gas jet nozzle 35 before gas jetting (see FIG. 8(a)) or both the secondary raw material lead-in path 71 and the lead-in path 31 for the object to be treated may join the gas jet nozzle 35 before gas jetting (see FIG. 8(b)).

In this case, because the secondary raw material H and the fed gas C are mixed sufficiently due to the joining before jetting, the composition of the treated object E is adjusted more uniformly.

Embodiment 9

Figure 9:
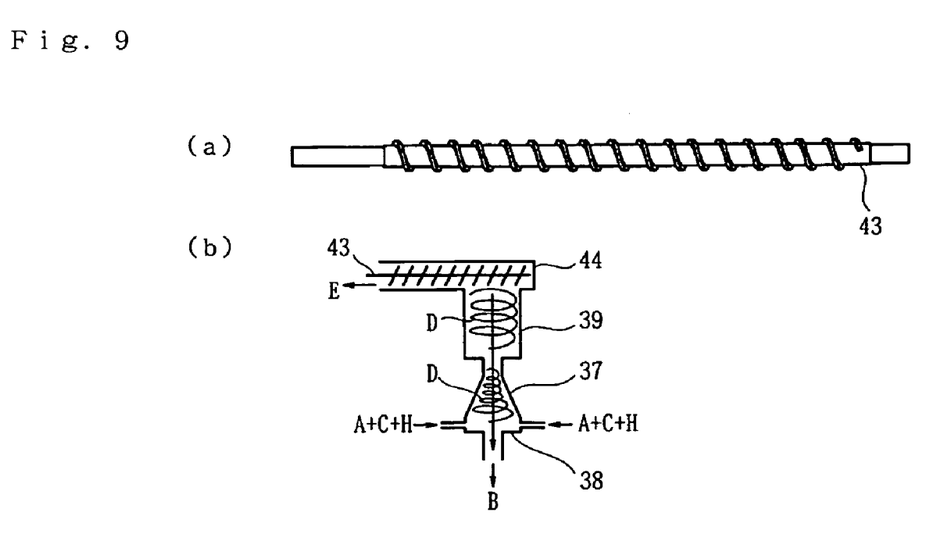
FIG. 9(a) is a side view of a screw feeder and FIG. 9(b) is a sectional diagram illustrating a dehydrating treatment zone and a treated object lead-in path.

A concrete structure of embodiment 9 of a sludge dehydrating processor of the invention will be described with reference to the drawings. FIGS. 9(a) and 9(b) show a structure of a treated object lead-in portion, wherein FIG. 9(a) is a side view of a screw feeder 43 and FIG. 9(b) is a sectional diagram illustrating a dehydrating treatment zone 30 and a treated object lead-in path 44.

This sludge dehydrating processor is different from those of the above-described embodiments 1 to 8 in that the screw feeder 43 as a component of the treated object lead-in portion of treated object retrieving equipment is connected to the treated object discharge port of the dehydrating treatment chamber 36 in the dehydrating treatment zone 30. The screw feeder 43 is rotatably fitted in the hollow portion of the treated object lead-in path 44 and is rotated about its axis by a rotational drive mechanism (not shown) and the treated object lead-in path 44 connects the treated object discharge port of the-other-end-side member 39 of the dehydrating treatment chamber 36 and the treated object lead-in port of the treated object retrieving tank 41 to allow them to communicate with each other. The screw feeder 43 is made of metal and having an axis diameter of 30 to 300 mm, a groove pitch of 10 to 100 mm, a groove depth of 5 to 30 mm, a length of 300 to 3000 mm, and a rotation speed of 10 to 100 rpm according to normal and preferable specifications, however the screw feeder 43 is not restricted to them.

In this case, by adjusting the rotation speed of the screw feeder 43 and the like, it is possible to easily adjust/finely adjust a retrieving speed of the treated object E by the screw feeder 43. By balancing the retrieving speed with a spirally traveling speed of the vortex air current D in the dehydrating treatment chamber 36, the object A to be treated temporarily floats and suspends before the screw feeder 43 to form a fluid cloud and moves to the screw feeder 43 after this process. As a result, the object A to be treated is exposed to gas for an additional period of time with an increased area to thereby further facilitate evaporation and separation of water from the object A to be treated.

On a downstream side of the screw feeder 43, a proper stationary tank, a stationary hopper, a hopper wagon, turret or traveling can body/can body carrying equipment, or the like may be provided besides the above-described treated object retrieving tank 41 as collecting equipment. A truck or a trolley is effective not only at collection of the solid fertilizer but also at carrying out of the solid fertilizer.

Embodiment 10

Figure 10:
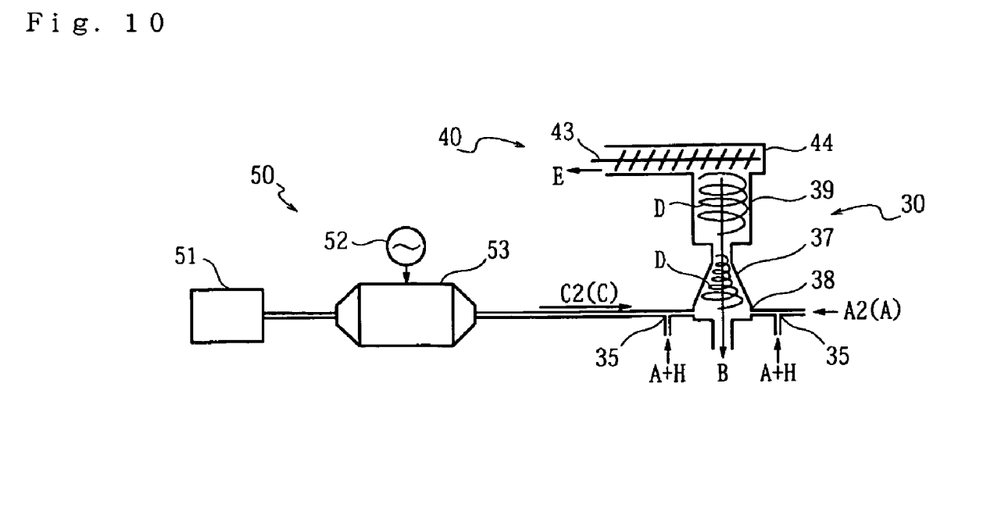
FIG. 10 is a sectional diagram illustrating a dehydrating treatment zone and a treated object lead-in portion of embodiment 10 of the invention.

A concrete structure of embodiment 10 of a sludge dehydrating processor of the invention will be described with reference to the drawing. FIG. 10 is a sectional diagram illustrating a dehydrating treatment zone 30 and a treated object lead-in path 44.

This sludge dehydrating processor is different from that of the above-described embodiment 9 in that a superheated vapor generator 50 is connected to the gas jet nozzle 35 in the dehydrating treatment zone 30 as a gas feed mechanism 34.

The superheated steam generator 50 may be the same as that described in embodiment 5 and generates superheated steam C2 as fed gas C and blows the vapor C2 into the dehydrating treatment chamber 36 through the gas jet nozzle 35.

In this case, similarly to embodiment 5, because heat capacity per volume of the superheated steam C2 is about 1.2 times larger than that of air, heating efficiency of the object A to be treated increases. Moreover, due to deodorizing effect and odor generating source breaking down effect of the superheated steam, the treated object E does not give off a foul odor.

Embodiment 11

Figure 11:
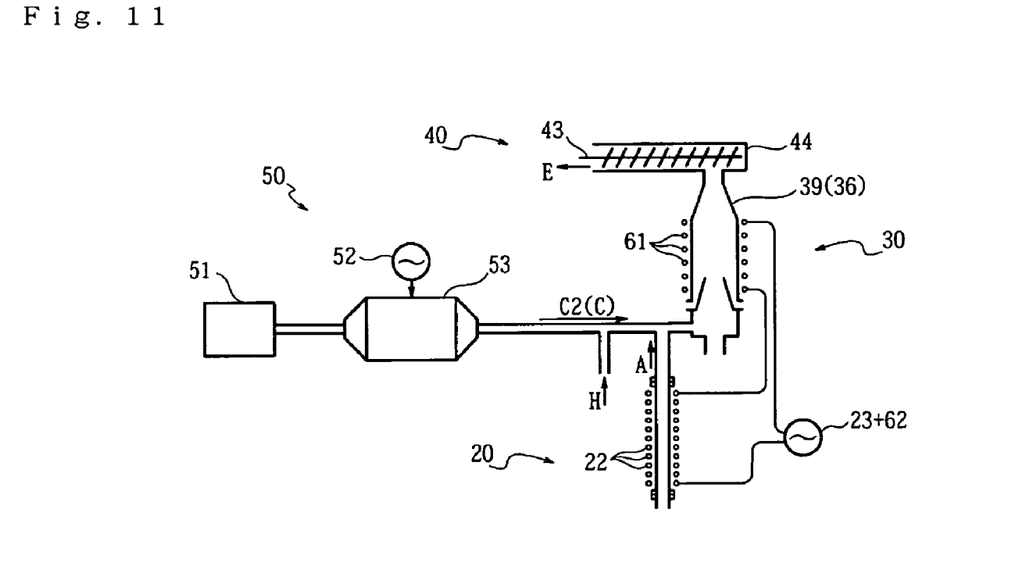
FIG. 11 is a sectional diagram illustrating a heating treatment zone, a dehydrating treatment zone, and a treated object lead-in portion of embodiment 11 of the invention.

A concrete structure of embodiment 11 of a sludge dehydrating processor of the invention will be described with reference to the drawing. FIG. 11 is a sectional diagram illustrating a heating treatment zone 20, a dehydrating treatment zone 30, and a treated object lead-in portion 44.

This sludge dehydrating processor is different from that of the above-described embodiment 10 in that a dehydration accelerating induction coil 61 is provided to the-other-end-side member 39 of the dehydrating treatment chamber 36 in the dehydrating treatment zone 30 in such a manner as to surround the-other-end-side member 39 and that a high-frequency power supply unit 62 for passing a high-frequency current through the dehydration accelerating induction coil 61 for inductively heating the dehydrating treatment chamber 36 is installed additionally.

The dehydration accelerating induction coil 61 and the high-frequency power supply unit 62 may be the same as those described above in embodiment 6. The high-frequency power supply unit 62 may be provided separately from the high-frequency power supply unit 23 or the same high-frequency power supply unit 62 (23) may be shared.

In this case, because the object A to be treated is heated not only in the heating treatment zone 20 but also in the dehydrating treatment zone 30, dehydrating treatment efficiency and dehydration rate of the object A to be treated are increased to thereby obtain the treated object E which has been dried sufficiently.

Embodiment 12

Figure 12:
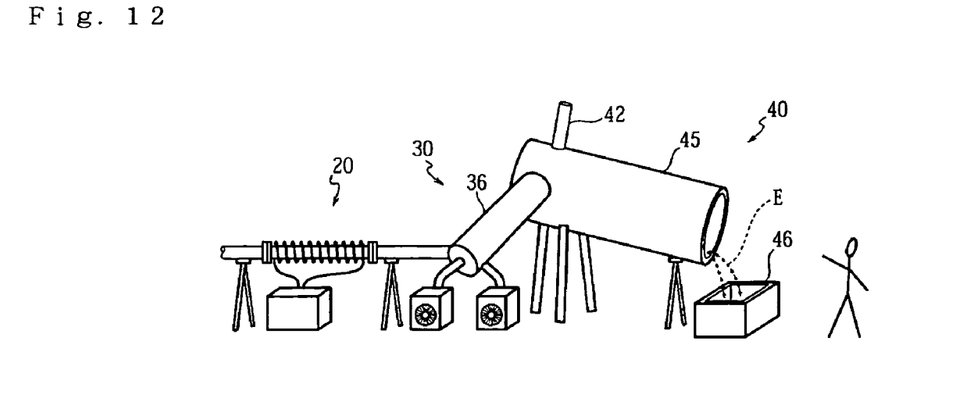
FIG. 12 is an external perspective view of a heating treatment zone, a dehydrating treatment zone, and a retrieving zone of embodiment 12 of the invention.

A concrete structure of embodiment 12 of a sludge dehydrating processor of the invention will be described with reference to the drawing. FIG. 12 is an external perspective view of a heating treatment zone 20, a dehydrating treatment zone 30, and a treated object retrieving zone 40.

This sludge dehydrating processor is different from that of the above-described embodiment 1 in that the treated object retrieving equipment in the treated object retrieving zone 40 collects the treated object E by utilizing gravity.

In this example, the treated object retrieving equipment is formed of an inclined cylinder 45 and a carry out container 46. An upper end of the inclined cylinder 45 is closed and the treated object discharge port of the dehydrating treatment chamber 36 communicates with and is connected to the upper end portion of the inclined cylinder 45. An emission smokestack 42 is also mounted to the upper end portion of the inclined cylinder 45. A lower end of the inclined cylinder 45 is open and is slightly higher than the carry-out container 46. An inclination of the inclined cylinder 45 is about 5 to 20°, for example, so that the treated object E slowly slides down. An inner diameter of the inclined cylinder 45 is about 500 to 3000 mm, for example, according to necessity of raking out of the treated object E with a rake, walk-in operation, and application of an unloader.

In this case, when the treated object E is discharged from the treated object discharge port of the dehydrating treatment chamber 36 to the upper end portion of the inclined cylinder 45, the treated object E slowly slides down through the hollow portion of the inclined cylinder 45 by its own weight and is discharged when it comes to a position right above the carry-out container 46. Therefore, even if the carry out container 46 and the inclined cylinder 45 are formed as separate bodies, the treated object E rarely flies off and enters the carry-out container 46.

It is also possible that an opening/closing member or the like is attached to the lower end of the inclined cylinder 45 to thereby temporarily stop discharge of the treated object E in replacement of the carry-out container 46. When the sludge dehydrating processor is installed on a slope, by setting up a rain cover or the like over the slope surface and installing a driveway apron on a lower side of the slope, the treated object retrieving equipment can be achieved by utilizing a drop or a slope and therefore the treated object retrieving zone 40 can be achieved almost without equipment cost.

Embodiment 13

Figure 13:
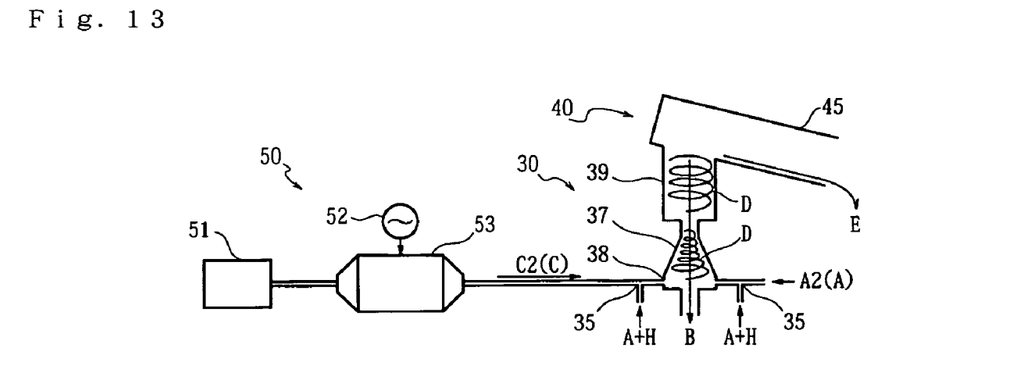
FIG. 13 is a sectional diagram illustrating dehydrating treatment and retrieving zones of embodiment 13 of the invention.

A concrete structure of embodiment 13 of a sludge dehydrating processor of the invention will be described with reference to the drawing. FIG. 13 is a sectional diagram illustrating a dehydrating treatment zone 30 and a treated object retrieving zone 40.

This sludge dehydrating processor is different from that of the above-described embodiment 12 in that the superheated steam generator 50 is connected to the gas jet nozzle 35 in the dehydrating treatment zone 30 as the gas feed mechanism 34.

The superheated steam generator 50 may be the same as those described in embodiments 5 and 10 and generates superheated steam C2 as fed gas C and blows the vapor C2 into the dehydrating treatment chamber 36 through the gas jet nozzle 35.

In this case, because heat capacity per volume of the superheated steam C2 is about 1.2 times larger than that of air, heating efficiency of the object A to be treated increases. Moreover, due to deodorizing effect and odor generating source breaking down effect of the superheated steam, the treated object E does not give off a foul odor.

Embodiment 14

Figure 14:
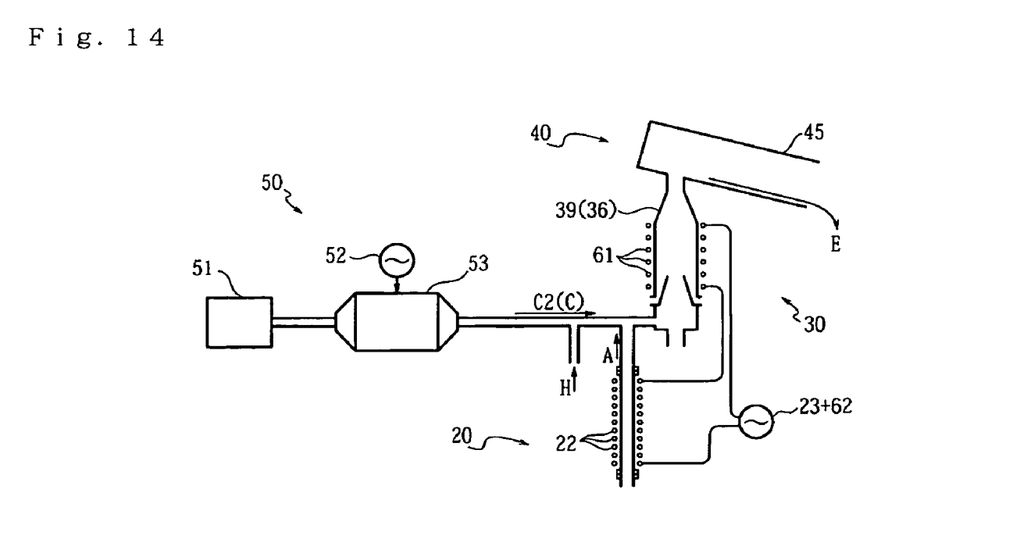
FIG. 14 is a sectional diagram illustrating a heating treatment zone, a dehydrating treatment zone, and a retrieving zone of embodiment 14 of the invention.

A concrete structure of embodiment 14 of a sludge dehydrating processor of the invention will be described with reference to the drawing. FIG. 14 is a sectional diagram illustrating a heating treatment zone 20, a dehydrating treatment zone 30, and a treated object retrieving zone 40.

This sludge dehydrating processor is different from that of the above-described embodiment 13 in that the dehydration accelerating induction coil 61 is provided to the-other-end-side member 39 of the dehydrating treatment chamber 36 in the dehydrating treatment zone 30 in such a manner as to surround the-other-end-side member 39 and that the high-frequency power supply unit 62 for passing the high-frequency current through the dehydration accelerating induction coil 61 is installed additionally for inductively heating the dehydrating treatment chamber 36.

The dehydration accelerating induction coil 61 and the high-frequency power supply unit 62 may be the same as those described above in embodiments 6 and 11. The high-frequency power supply unit 62 may be provided separately from the high-frequency power supply unit 23 or the same high-frequency power supply unit 62 (23) may be shared.

In this case, because the object A to be treated is heated not only in the heating treatment zone 20 but also in the dehydrating treatment zone 30, dehydrating treatment efficiency and dehydration rate of the object A to be treated are increased to thereby obtain the treated object E which has been dried sufficiently.

Embodiment 15

Figure 15:
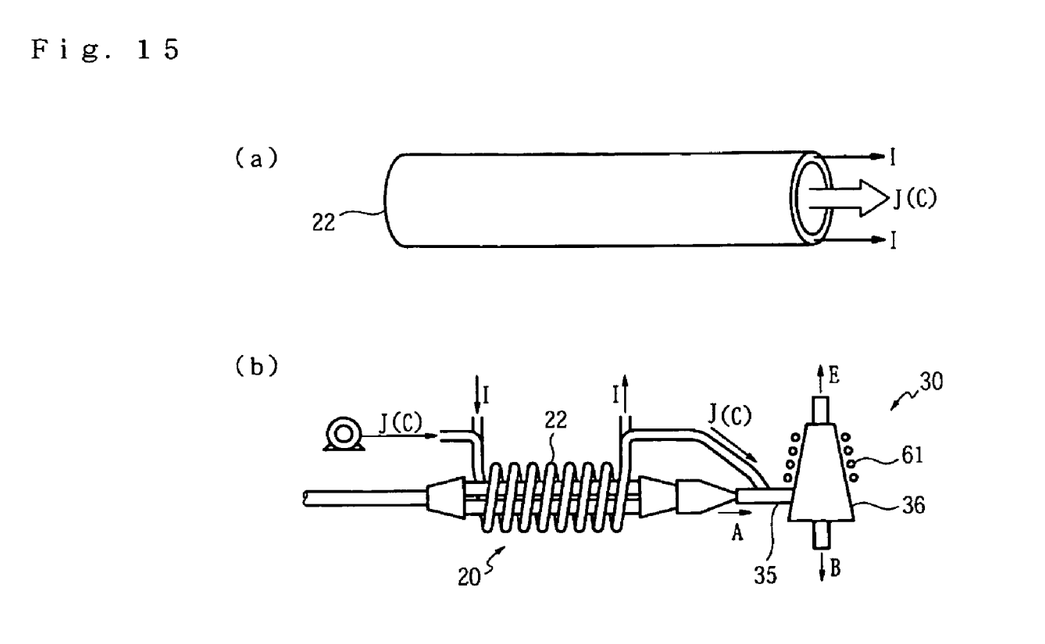
FIG. 15(a) is a partial enlarged view of a heating induction coil and FIG. 15(b) is an external view of essential portions of a heating treatment zone and a dehydrating treatment zone of embodiment 15 of the invention.

A concrete structure of embodiment 15 of a sludge dehydrating processor of the invention will be described with reference to the drawings. FIG. 15(a) is an enlarged view of a portion of a heating induction coil 22 and FIG. 15(b) is an external view of essential portions of a heating treatment zone 20 and a dehydrating treatment zone 30.

This sludge dehydrating processor is different from those of the above-described embodiments 1 to 14 in that a refrigerant passage for cooling the heating induction coil 22 in the heating treatment zone 20 is provided to the coil, that one end of the refrigerant passage is coupled to a discharge port of a blower or the like, and that the other end of the refrigerant passage is formed as the gas jet nozzle 35.

A hollow copper pipe or the like is employed as the heating induction coil 22 with its pipe body portion used as a cable way for high-frequency current I and its hollow portion used as a passage for a refrigerant gas J (see FIG. 15(a)). Each of lead portions at opposite ends of the heating induction coil 22 (see FIG. 15(b)) diverges into the cable way for the high-frequency current I and the refrigerant passage for the refrigerant gas J (C) while the cable way for the high-frequency current I and the refrigerant passage for the refrigerant gas J (C) are integral with each other at the heating induction coil 22. An inner diameter of a typical example of the heating induction coil 22 is 50 to 500 mm, however the inner diameter is not restricted to it.

In this case, the fed gas C sent out from the blower is first fed as the refrigerant gas J through the refrigerant passage such as the hollow portion of the copper pipe of the heating induction coil 22 to cool the heating induction coil 22 and, as a reaction, is heated and temperature of the fed gas C increases. The refrigerant gas J which has finished cooling of the heating induction coil 22 and the temperature of which has become high is jetted from the gas jet nozzle 35 as the fed gas C of the gas feed mechanism and is blown into the dehydrating treatment chamber 36. Thus, power consumed by the heating induction coil 22 is utilized not only as heat source for increasing the temperature of the object A to be treated in the heating treatment zone 20 but also as heat source for increasing the dehydrating efficiency in the dehydrating treatment zone 30.

As a result, electric energy forming a large proportion of running cost is used up to thereby improve energy efficiency.

Moreover, similarly to use of the refrigerant for the heating induction coil 22, when the dehydration accelerating induction coil 61 is provided additionally to the dehydrating treatment chamber 36 in the dehydrating treatment zone 30, it is also possible that a refrigerant passage for cooling the dehydration accelerating induction coil 61 is provided also to the coil 61 and that the refrigerant gas which has been fed into the passage and has finished cooling of the coil is also fed into the gas jet nozzle 35 as the fed gas C. Although power consumption of the dehydration accelerating induction coil 61 is lower than that of the heating induction coil 22, reasonable effect can be additionally obtained.

The processor of the invention is not limited to forms and examples of use described in the above embodiments and can properly be changed in form and can be used in combination or for various uses.

For example, the sludge dehydrating processor of the invention can be applied to heating sterilization drying of food, soil treatment, and the like in addition to processing of the waste sludge including the living body scraps into the solid raw fertilizer.

What is claimed is:

1. A sludge dehydrating processor for converting sludge including an organic substance into resources of low water content, the processor comprising
    a heating treatment zone for heating the sludge fed while flowing as an object to be treated to a sterilizing treatment temperature and a dehydrating treatment/retrieving zone for carrying out treatment of separating water from the high-temperature object to be treated which has passed through the heating treatment zone and retrieval of treated object which has been subjected to the treatment,
    wherein the heating treatment zone includes: a feed heating kiln body formed of at least one metal pipe in such a manner that a hollow portion of the metal pipe functions as a flow path for the object to be treated; a heating induction coil disposed to surround the kiln body to inductively heat the kiln body; and a high-frequency power supply unit for driving the coil and
    the dehydrating treatment/retrieving zone includes: a cylindrical dehydrating treatment chamber; at least one lead-in path for the object to be treated and provided on one end side of the treatment chamber; at least one gas jet nozzle provided on the one end side so as to produce a vortex air current for causing the led-in object to be treated to travel via a route spirally swirling along an inner peripheral surface of the treatment chamber and in such a manner that a substantial tangent direction of the gas jet nozzle is a jetting direction on the inner peripheral surface; a gas feed mechanism for the nozzle; a treated object discharge port provided to the other end side of the treatment chamber; treated object retrieving equipment following the discharge port; an exhaust port provided to the one end side; and a forced exhaust mechanism connected to the exhaust port.

2. A sludge dehydrating processor according to claim 1, wherein a static mixer is mounted in the hollow portion of the metal pipe forming the feed heating kiln body in the heating treatment zone.

3. A sludge dehydrating processor according to claim 1, wherein the dehydrating treatment chamber in the dehydrating treatment/retrieving zone is in a tapered shape in such a manner that an inner diameter of at least one section of the chamber in a direction from the one end side toward the other end side decreases toward the other end side.

4. A sludge dehydrating processor according to claim 1, wherein the lead-in path for the object to be treated in the dehydrating treatment/retrieving zone is provided to join the gas jet nozzle.

5. A sludge dehydrating processor according to claim 1, wherein a superheated steam generator is connected as the gas feed mechanism to the gas jet nozzle in the dehydrating treatment/retrieving zone.

6. A sludge dehydrating processor according to claim 1, wherein a dehydration accelerating induction coil driven by the high-frequency power supply unit or another high-frequency power supply unit to inductively heat the treatment chamber is provided in the dehydrating treatment chamber in the dehydrating treatment/retrieving zone in such a manner as to surround the dehydrating treatment chamber.

7. A sludge dehydrating processor according to claim 1, wherein a secondary raw material lead-in path for leading secondary raw material for adjusting composition of the treated object led into the dehydrating treatment/retrieving zone into the dehydrating treatment/retrieving zone is provided on a side of the dehydrating treatment/retrieving zone where the gas feed mechanism is disposed.

8. A sludge dehydrating processor according to claim 7, wherein the secondary raw material lead-in path in the dehydrating treatment/retrieving zone is provided to join the gas jet nozzle.

9. A sludge dehydrating processor according to claim 1, wherein a screw feeder is connected as a component of a treated object lead-in portion of the treated object retrieving equipment to the treated object discharge port in the dehydrating treatment/retrieving zone.

10. A sludge dehydrating processor according to claim 9, wherein a superheated steam generator is connected as the gas feed mechanism to the gas jet nozzle in the dehydrating treatment/retrieving zone.

11. A sludge dehydrating processor according to claim 9, wherein a dehydration accelerating induction coil driven by the high-frequency power supply unit or another high-frequency power supply unit to inductively heat the treatment chamber is provided in the dehydrating treatment chamber in the dehydrating treatment/retrieving zone in such a manner as to surround the dehydrating treatment chamber.

12. A sludge dehydrating processor according to claim 1, wherein the treated object retrieving equipment in the dehydrating treatment/retrieving zone collects the treated object discharged from the treated object discharge port by utilizing gravity.

13. A sludge dehydrating processor according to claim 12, wherein a superheated steam generator is connected as the gas feed mechanism to the gas jet nozzle in the dehydrating treatment/retrieving zone.

14. A sludge dehydrating processor according to claim 12, wherein a dehydration accelerating induction coil driven by the high-frequency power supply unit or another high-frequency power supply unit to inductively heat the treatment chamber is provided in the dehydrating treatment chamber in the dehydrating treatment/retrieving zone in such a manner as to surround the dehydrating treatment chamber.

15. A sludge dehydrating processor according to claim 1, wherein a refrigerant passage for cooling the heating induction coil in the heating treatment zone is provided to the coil and refrigerant gas which has been fed into the passage and has finished cooling of the coil is supplied to the gas feed mechanism as fed gas to the gas jet nozzle in the dehydrating treatment/retrieving zone.

* * * * *